United States Patent [19]

Tsurunaga

[11] Patent Number: 4,779,660
[45] Date of Patent: Oct. 25, 1988

[54] PNEUMATIC BIAS TIRE FOR USE ON ROUGH ROAD

[75] Inventor: Yasuaki Tsurunaga, Musashimurayama, Japan

[73] Assignee: Bridgestone Corporation, Tokyo, Japan

[21] Appl. No.: 16,910

[22] Filed: Feb. 20, 1987

[30] Foreign Application Priority Data

Feb. 20, 1986 [JP] Japan .................. 61-35782

[51] Int. Cl.$^4$ .......................... B60C 9/06; B60C 9/14
[52] U.S. Cl. ..................................... 152/559; 152/549; 152/555
[58] Field of Search ............... 152/549, 555, 556, 559, 152/564

[56] References Cited

U.S. PATENT DOCUMENTS

| | | | |
|---|---|---|---|
| 3,989,083 | 11/1976 | Chrobak | 152/559 X |
| 4,296,790 | 10/1981 | Sakai et al. | 152/559 X |
| 4,349,062 | 9/1982 | Tsurunaga et al. | 152/559 X |
| 4,438,796 | 3/1984 | Abe et al. | 152/555 X |
| 4,442,880 | 4/1984 | Takahashi | 152/559 |

Primary Examiner—Michael W. Ball
Assistant Examiner—Ramon R. Hoch
Attorney, Agent, or Firm—Sughrue, Mion, Zinn, Macpeak and Seas

[57] ABSTRACT

A pneumatic bias tire for use on rough road is disclosed, having a carcass with an improved durability. The carcass composed of not less than twelve carcass plies toroidally extending from a tread to sidewalls wherein rubber sheets are interposed between carcass plies of at least the outermost and the innermost bundles each of which comprises at least two carcass plies, the bead side ends and the tread side ends of the rubber sheets being terminated in specific regions, respectively to provide rubber material having an increased thickness between carcass plies so that the rigidity of carcass at the sidewall portion subjected to large compression strain and at the turned-back ends of carcass plies subjected to shearing strain is improved.

4 Claims, 4 Drawing Sheets

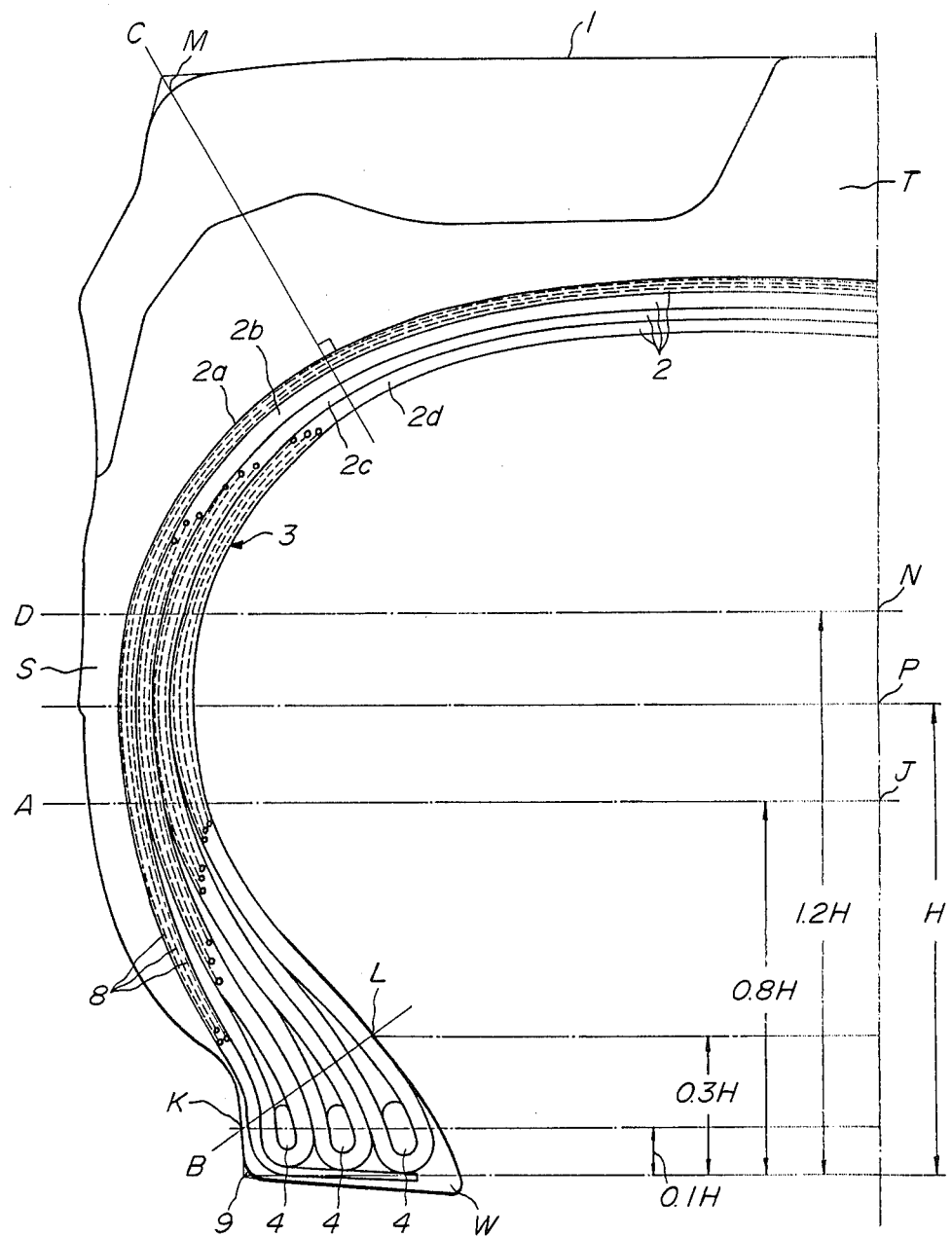
FIG_1

FIG_2
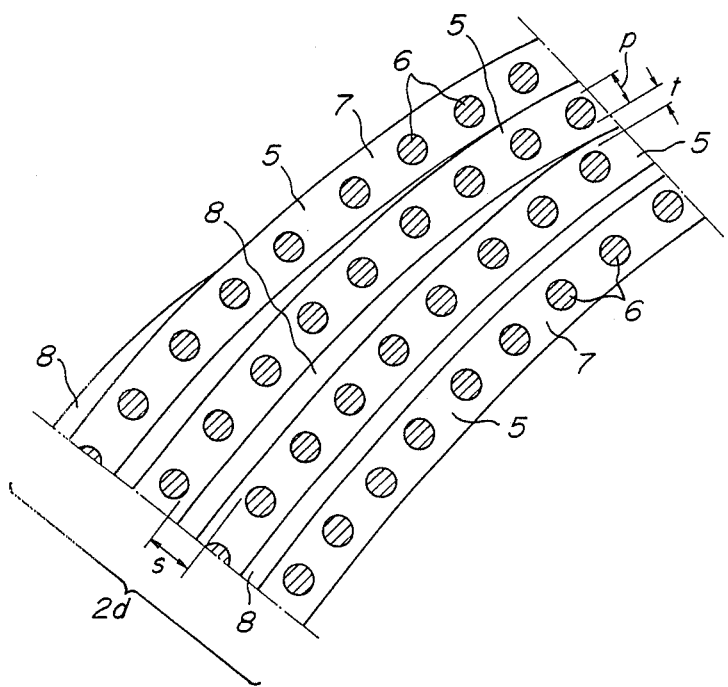

FIG_3
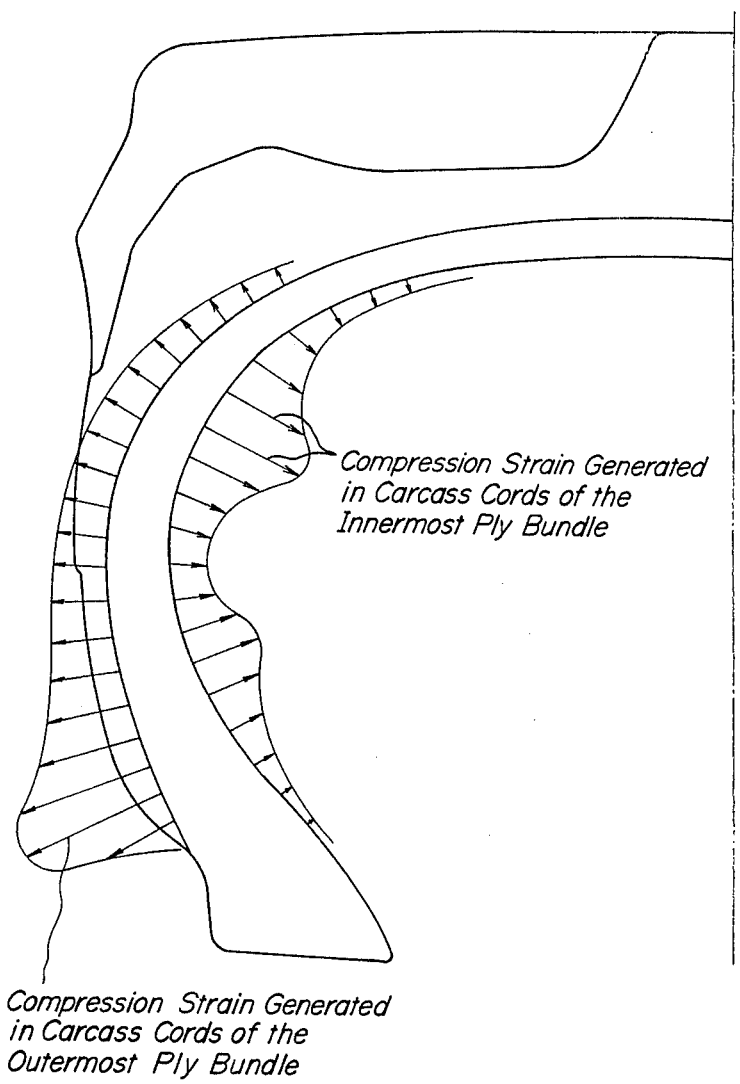

FIG_4
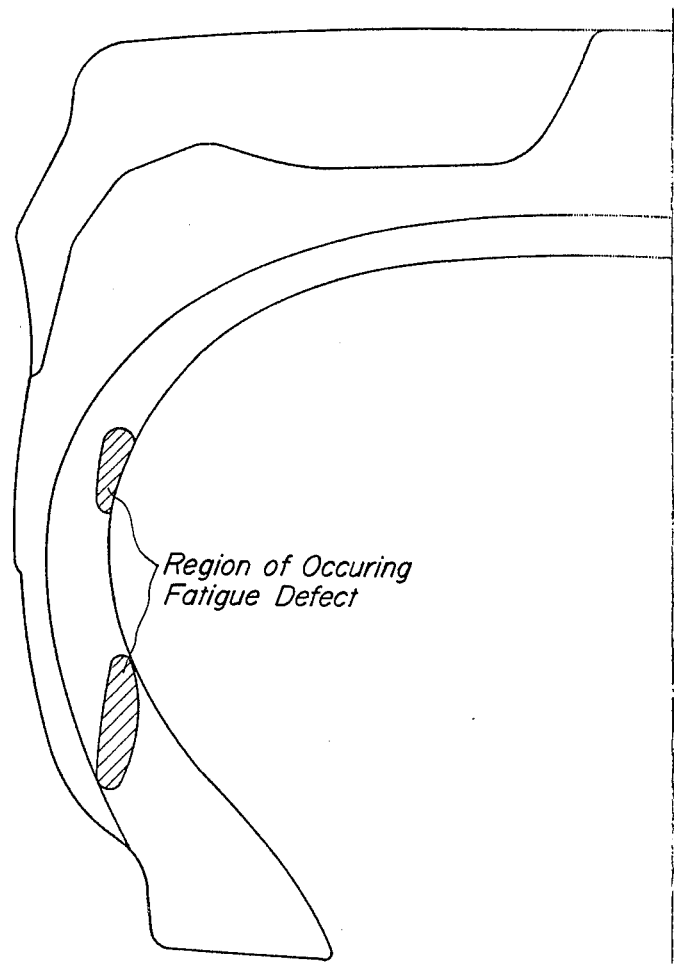
Region of Occuring Fatigue Defect

PNEUMATIC BIAS TIRE FOR USE ON ROUGH ROAD

BACKGROUND OF THE INVENTION

1. Field of the Invention

The present invention relates to a pneumatic bias tire for use on rough roads and more particularly to a pneumatic bias tire with a carcass having improved durability for use in a large wheel loader and the like.

2. Related Art Statement

Generally, a pneumatic bias tire for use on rough road, used for a large wheel loader and the like has a problem such that when running, cords in carcass plies may be repeatedly subjected to compression strain which ultimately results in cord breaking up (CBU) caused by fatigue thereof. Also, the carcass plies may be subjected to shearing strain producing fine cracks between the carcass plies which also ultimately results in burst of tire.

In order to solve the aforementioned problems, heretofore, it has been proposed to increase number of carcass plies to uniformly improve the rigidity of the whole carcass or to insert rubber sheets extending from one of beads to another bead between carcass plies to uniformly improve the rigidity of the whole carcass.

However, such a tire having improved carcass rigidity shows an effect sufficient to prevent the cord breaking up, but there have been raised other problems such that the weight of the tire is largely increased as well as the manufacturing cost is largely increased since the number of carcass plies or rubber sheets is necessarily increased as the condition of using of the tire became severe. Such a problem is particularly significant in a large tire having a carcass composed of not less than twelves carcass plies.

SUMMARY OF THE INVENTION

An object of the present invention is to provide a pneumatic bias tire for use on rough road which eliminates the aforementioned drawbacks and greatly improves durability.

According to the present invention, there is the provision of in the pneumatic bias tire for use on rough roads comprising a carcass of bias structure composed of not less than twelve carcass plies each including carcass cords, a plurality of bundles being formed of at least two carcass plies, the carcass plies toroidally extending from a tread to sidewalls and beads and being layered with a thickness of rubber material between carcass plies being within a range of 30~80% of a diameter of the carcass cord and rubber sheets being interposed between carcas plies of at least the outermost and the innermost bundles to provide an increased thickness between carcass plies being within a range of 85~350% of a diameter of the carcass cord, the bead side end of each of the rubber sheets being terminated in a region between a straight line "A" which extends in the axial direction at a height of 0.8 time of "H" which is a height measured from the bead heel to a position of the maximum width of inside of the sidewall and a straight line "B" which connects a position on the outside of the sidewall at a height of 0.1 time of the "H" from the bead heel and a position on the inside of the sidewall at a height of 0.3 time of the "H" from the bead heel and the tread side end of each of the rubber sheets being terminated in a region between a straight line "C" which extends perpendicularly to the outermost ply and passes the shoulder "M" and a straight line "D" which extends in the axial direction at a height of 1.2 times of the "H" from the bead heel.

In general, the cords contained in the carcass ply of the tire are subjected to repetitive compression strain when the tire runs. The value of the compression strain is particularly large at the outermost and the innermost ply bundles in the sidewall. Therefore, according to the present invention, each of the plies in the sidewall is covered with a rubber sheet by inserting the rubber sheet between the carcass plies. The rubber sheet is extended in the sidewall such that the bead side end of the rubber sheet is terminated in the region between the lines "A" and "B" and the tread side end of the rubber sheet is terminated in the region beween the lines "C" and "D". The rubber sheets are essentially interposed between all the carcass plies of at least the outermost and the innermost ply bundles. Thus, the rigidity of carcass at the portion subjected to large compression strain can be improved, while increment of the weight and the manufacturing cost of tire are limited as small as possible.

Moreover, fine cracks caused by shearing strain between the carcass plies occur only at the turned-back ends of the carcass plies, but these turned-back ends are also covered by the rubber sheets, respectively, so that any occurrence of fine crack caused by the shearing strain is effectively prevented.

These and other objects, features and advantages of the invention will be appreciated upon reading of the following description of the invention when taken in conjunction with the attached drawings with understanding that some modifications, variations, and changes of the same could be easily done by the skilled in the art to which the invention pertains without departing from the spirit of the invention or the scope of the claims appended hereto.

BRIEF DESCRIPTION OF THE DRAWINGS

FIG. 1 is a diagrammatic sectional view taken along the meridian of the tire illustrating an embodiment of the tire according to the present invention;

FIG. 2 is a fragmentary sectional view, on an enlarged scale, of the innermost ply bundle;

FIG. 3 is a diagrammatic sectional view taken along the meridian of the tire illustrating the distribution of compression strain in the carcass cords; and FIG. 4 is a diagrammatic sectional view taken along the meridian of the tire illustrating the region of occurring defects caused by fatigue.

DESCRIPTION OF THE PREFERRED EMBODIMENT

Referring FIGS. 1 and 2, the rough road running pneumatic bias tire for use in a large wheel loader and the like is generally designated by reference numeral 1. The tire 1 has a toroidal carcass 3 of bias structure composed of a plurality of carcass ply bundles 2 which are toroidally extended from a tread "T" to a pair of sidewalls "S" and a pair of beads "W". Each of the beads includes a plurality of bead rings 4 being embedded therein and spaced from each other in the axial direction. Each opposite end portion of the ply bundles 2b, 2c and 2d except the outermost ply bundle 2a are turned back by an angle of 180° around each of the bead rings 4 from inside to the outside of the tire to be anchored to the bead rings, respectively. The opposite ends of the outermost ply bundle 2a are turned by an angle of 90° towards the inside of the bead. Each ply bundle is formed of at least two layered carcass plies. The number of carcass plies 5 of each of the ply bundles 2 may differ from each other. The carcass 3 is composed of not less than twelve carcass plies 5 each of which contains a number of carcass cords 6 which are arranged at an angle to the median equational plane of tire and are coated with rubber layers 7. These carcass plies 5 are layered with their cords 6 being arranged such that the cords in the successively layered carcass plies are intersected.

When such a tire 1 runs under a load, the sidewall of the tire is flexed to cause compression strain in the carcass cords 6 of each of the carcass plies. Such a compression strain occurs repeatedly in the carcass cords 6 by rotation of the tire 1 so that the cords are fatigued and ultimately resulted in a cord breaking up.

The inventors have made studies and found that the compression strain in the carcass cords 6 of each of the ply bundles is large at the outermost and the innermost ply bundles and more particularly is largest at a specific region of the sidewall where it is largely deflected as shown in FIG. 3. Such a recognition is supported actually by result of tests as shown in FIG. 4 illustrating fatigue defects occurred in the hatched region. Therefore, in order to reduce the deflection of the tire while increase of the weight and the manufacturing cost of the tire is as less as possible, it is preferable to increase the radial bending rigidity and the radial compression rigidity in the portion where large compression strain occurs. Thus, according to the present invention, in order to increase the rigidity rubber sheets are interposed between the carcass plies of at least the outermost and the innermost ply bundles, i.e. the rubber sheets are always interposed between the carcass plies of the outermost and the innermost ply bundles, while may be optionally interposed between the carcass plies of the remaining ply bundles, if necessary. In the embodiment shown in FIG. 1, the rubber sheets 8 are interposed between the carcass plies not only the outermost and the innermost ply bundles 2b and 2d, but also the remaining outer and inner ply bundles 2b and 2c. When the width and the thickness of the rubber sheets are same size for all the ply bundles, the efficiency of production is improved. The rubber sheets are successively inserted, as illustrated in FIG. 2., between each of the carcass plies 5 from the outer carcass ply 5 where large compression strain occurs to the inner carcass ply. Particularly, in the outermost and the innermost ply bundles 2a and 2d, the rubber sheets are inserted between all the carcass plies. The rubber sheets to be inserted between intermediate carcass plies 5 may be omitted in order to reduce the weight and raise the productivity of the tire, but the rubber sheets are preferably inserted between the carcass plies 5 of not less than ⅔ of all the carcass plies. This reason is that when the number of the rubber sheets inserted between the carcass plies are less than ⅔ of total of carcass plies, increasing effect of carcass rigidity is too small to effectively prevent the cord breaking up. For example, when the total number of the carcass plies 5 is not less than twenty, the number of carcass plies with the rubber sheet interposed therebetween is not less than 20×⅔ i.e. not less than fourteen, if it is assumed that the outer portion of the outermost carcass ply 5 in each of the ply bundle 2 is positioned between this outermost carcass ply 5 and the innermost carcass ply 5 in the adjacent ply bundle 2. In the finished tire, the thickness "t" between carcass plies 5 without the rubber sheet 8, i.e. the thickness of rubber material between the cords 6 in the direction of the thickness of the carcass ply is to be within a range of 30°~80° of the diameter "p" of the cord 6. The reason of the aforementioned limitation is that if the thickness of rubber material between the plies is less than 30% of the diameter of the cord, the cords may contact each other owing to error of production, and on the other hand, if the thickness of rubber material between the plies is more than 80% of the diameter of the cord, the ply bundle becomes too thick to keep a high operation efficiency.

While, in the finished tire, the thickness "s" between carcass plies in the portion wherein the rubber sheet 8 is inserted therebetween is to be within a range of 85~350% of the diameter "p" of cord. The reason of such a limitation is that if the thickness is less than 85% of the diameter of cord, the rubber sheet is too thin to manufacture, on the other hand if the thickness is more than 350% of the diameter of cord, the effect of preventing the cord breaking up is not significantly improved, but the weight and the manufacturing cost increase. It is understood that the "diameter p" of the cord 6 means a square root of the sectional area of the cord 6 being four times and divided by $\pi$.

Furthermore, the bead side end of each of the rubber sheets 8 is terminated in a region between a straight line "A" which extends in the axial direction at a position "J" of a height of 0.8 times "H" which is a height measured from the bead heel 9 of the bead "W" to a position "P" of the maximum width of inside of the sidewall and a straight line "B" which connects a position "K" on the outside of the sidewall "S" at a height of 0.1 times "H" from the bead heel 9 and a position "L" on the inside of the sidewall "S" at a height of 0.3 times "H" from the bead heel 9. The bead side end of the rubber sheet 8 which is positioned in the inner side is preferably further away from the bead heel 9 than that positioned in the outer side. The reason of such an arrangement is that a position of the peak of the compression strain is further away from the bead heel 9 as the carcass ply is nearer the inner side of the sidewall as shown in FIG. 3.

On the other hand, the tread side end of each of the rubber sheets is terminated in a region between a straight line "C" which extends perpendicularly to the outermost ply 5 in the outermost ply bundle 2a and passes the shoulder "M" and a straight line "D" which extends in the axial direction at a height of 1.2 times of the "H" from the bead heel 9. By extending the bead side end and the tread side end of the rubber sheet 8 into the region as aforementioned, the rigidity of the carcass is effectively increased while amount of rubber material is saved. It is noted that in the embodiment shown in FIG. 1 the rubber sheet is also inserted between the carcass plies 5 of the outermost ply bundle 2a in the portion of tread in order to prevent the cords in the outermost ply bundle from breaking up. In this case, the sidewall and the tread may be provided with separate rubber sheets by individually insertion between the carcass plies, but it is preferable to use a rubber sheet integrally extending from the tread to both the sidewalls in order to improve the operation efficiency.

Although the fine cracks which cause the cord breaking up are generated between the carcass plies 5 in the carcass 3 by the shearing strain as mentioned above, such a fine crack occur only at the turned-back end of the carcass ply.

However, the turnd-back end is covered by the rubber sheet 8 so that the thickness of rubber material between the cords is sufficient to reduce the shearing strain and to thereby prevent effectively the fine crack form occurring at the turned-back end of the carcass ply.

Some examples of the pneumatic bias tire according to the present invention are represented in Table 1 and the result of comparison tests which has been carried out by using the tires represented in the Table 1 and comparable conventional tires without rubber sheets is represented in Table 2. In these tests, the residual minimum value of strength in cord was measured after a vehicle provided with the test tires ran for 5000 hours and the improvement of carcass durability was decided by the measurement. The strength of the carcass cord in the Table 2 is represented by an index on a basis that the strength of new carcass cord is 100.

TABLE 1

| Tire size | 29.5-29 L 5 | 37.25-35 L-5 | 45/65-45 L-5 |
|---|---|---|---|
| Cord material | 1260 d/2 | 1260 d/2 | 1260 d/2 |
| Cord diameter (mm) | 0.61 | 0.61 | 0.61 |
| Number of plies | 18 | 26 | 26 |
| Structure of ply bundle | In 6-4-4-4 Out | In 8-6-6-4 Out | In 8-6-6-4 Out |
| Position of inserted rubber sheet | In 1st ply outside~6th ply outside 10th ply outside~18th ply outside Out | In 1st ply outside~8th ply outside 14th ply outside~26th ply outside Out | In 1st ply outside~26th ply outside Out |
| s/p (%) | 113 | 160 | 210 |
| t/p (%) | 48 | 79 | 79 |

Note 1:
The carcass of each tire is composed of four ply bundles, number of carcass plies of each ply bundle is represented by numeral. The underlined ply bundle is not turned back around the bead ring.
Note 2:
"1st ply outside" means that the rubber sheet is interposed between 1st and 2nd ply. "6th ply, 8th ply outside" means that the rubber sheets are interposed between the 6th ply, the 8th ply and the turned-back end of the 2nd ply bundle.
Note 3:
The reference numeral of the ply and the ply bundle is read successively from the innermost by 1st, 2nd, . . . . The side near "In" and "Out" in Table are the inner side and outer side, respectively.

TABLE 2

| Tire size | Conventional tire | Invention tire |
|---|---|---|
| 29.5-29 L-5 | 75 | 95 |
| 37.25-35 L-5 | 70 | 95 |
| 45/65-45 L-5 | 70 | 90 |

It can be understood from the above Table 2 that the durability of carcass in the tire of the present invention is remarkably improved. When the test tire of the present invention is compared with a tire wherein rubber sheets extending from one of the beads to the other bead are inserted between all the carcass plies, respectively, the weight and manufacturing cost of the tire of the present invention can be reduced about 5%, respectively.

As mentioned above, according to the present invention, the durability of carcass is improved to effectively prevent the cord from breaking up while increment of the weight and manufacturing cost is held as less as possible.

What is claimed is:

1. A pneumatic bias tire for use on rough road comprising; a carcass of bias structure composed of at least twelve carcass plies each including carcass cords, a plurality of bundles being formed of at least two said carcass plies, the carcass plies toroidally extending from a tread to sidewalls and beads and being layered with a thickness of rubber material between carcass plies being within a range of 30-80% of diameter of the carcass cord and, rubber sheets being interposed between carcass plies of at least the outermost and the innermost bundles to provide an increased thickness of rubber material between carcass plies being within a range of 85 to 350% of diameter of the carcass cord, a bead side end of each of the rubber sheets being terminated in a region between a line "A" which extends in the axial direction at a height of 0.8 times of a height "H", wherein "H" is a height measured from the bead heel to a position of the maximum width of the inside of the sidewall, and a line "B" which is connected to a position on the outside of the sidewall at a height of 0.1 times of the height "H" from the bead heel and a position on the inside of the sidewall at a height of 0.3 times of the height "H" from the bead heel, and the tread side end of each of the rubber sheets being terminated in a region between a straight line "C" which extends perpendicular to the outermost ply and passes the shoulder "M" and a straight line "D" which extends in the axial direction at a height of 1.2 times of the height "H" from the head heel.

2. The pneumatic bias tire as claimed in claim 3, wherein the rubber sheets are inserted between the carcass plies of not less than ⅔ of the total number of carcass plies.

3. The pneumatic bias tire as claimed in claim 1, wherein the rubber sheets are inserted between all of said carcass plies.

4. The pneumatic bias tire as claimed in claim 1, wherein said rubber sheets interposed between carcass plies extend integrally from said tread to both sidewalls of said tire.

* * * * *